United States Patent
Cavalleri et al.

[15] 3,699,151
[45] Oct. 17, 1972

[54] PHARMACOLOGICALLY ACTIVE COMPOUNDS

[72] Inventors: Bruno Cavalleri, Via Pierlombardo 25, Milan; Elvio Bellasio, Piazza IV Novembre, Albate (Como), both of Italy; Emilio Testa, San Simone Vacallo, Ticino, Switzerland; Giulio Maffii, Via Gioberti 2, Milan, Italy

[22] Filed: Aug. 5, 1968

[21] Appl. No.: 750,009

[30] Foreign Application Priority Data

Aug. 14, 1967 Great Britain..........37,197/67

[52] U.S. Cl.............260/473 R, 260/346.2, 260/469, 260/476 R, 424/308
[51] Int. Cl............................C07c 69/76, C07d 5/44
[58] Field of Search......260/476, 522, 476 R, 469, 473 R

[56] References Cited

UNITED STATES PATENTS

| | | | |
|---|---|---|---|
| 3,557,189 | 1/1971 | Eue et al. | 260/476 R |
| 3,567,742 | 3/1971 | Cavalleri et al. | 260/475 X |
| 3,476,803 | 11/1969 | Pine | 260/522 |
| 3,257,420 | 6/1966 | Szarvasi | 260/522 |
| 3,227,736 | 1/1966 | Tschesche et al. | 260/476 |
| 2,535,086 | 12/1950 | Moffett et al. | 260/522 |
| 1,964,516 | 6/1934 | Jaeger | 260/476 |
| 1,925,590 | 9/1933 | Jaeger | 260/476 |
| 1,892,766 | 1/1933 | Jaeger | 260/522 |

FOREIGN PATENTS OR APPLICATIONS

| | | | |
|---|---|---|---|
| 1,374,665 | 8/1964 | France | 260/476 |

OTHER PUBLICATIONS

Chemical Abstracts Vol. 57, Col. 16645f, 1962 Beletskaya et al.
J. Chem. Soc. July 1967, pp. 528–529 Chapman et al.

*Primary Examiner*—Lorraine A. Weinberger
*Assistant Examiner*—R. S. Weissberg
*Attorney*—Joseph Hirschmann

[57] ABSTRACT

A new class of derivatives of the ethyl ester of fluoroacetic acid is described and some methods for their preparation are reported. The compounds have a pharmacological interest, because of their marked antiinflammatory activity.

2 Claims, No Drawings

PHARMACOLOGICALLY ACTIVE COMPOUNDS

This invention is concerned with a new class of compounds and with the methods for preparing them. More particularly the compounds of the invention are represented by the following general formula:

$$R - CHF - COOC_2H_5$$

wherein R is a member of the class consisting of aryl, dibenzofuranyl, and a radical having the formula

wherein R' is selected from lower alkyl and lower alkoxy, the term "lower" having the significance of "with one to eight carbon atoms."

The compounds of the invention can be prepared according to one of the following methods:

A. A diethyl malonate of the formula

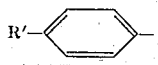

wherein R has the above significance, is reacted with an equimolecular amount of an alkali metal hydroxide in absolute ethanol at a room temperature.

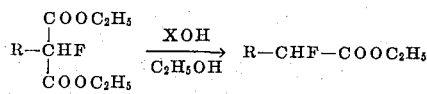

The symbol X represents an alkali metal.

B. The process consists in contacting a solution of a compound, having the general formula

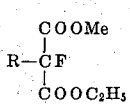

wherein R has the above significance and Me represents an alkali metal atom, in an organic, inert and anhydrous solvent, with a cationic, ion-exchange resin at a temperature of about 50°–75°.

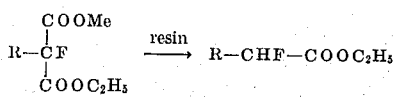

C. A compound of the general formula

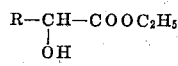

wherein R has the above significance, is reacted with 2-chloro-1,1,2-trifluoro-triethylamine, in an inert organic anhydrous solvent. Though the reaction takes place with about equimolecular amounts of the two reactants, it is preferred to use a more or less important excess of the second reactant.

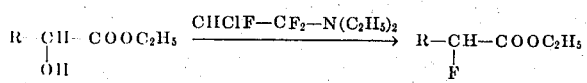

The compounds of the invention proved interesting for their antiinflammatory activity. This property was evaluated through the known carrageenin induced edema test in rats. We used for our experiments Wistar female rats of 120–150 g. body weight.

The drugs to be tested were administered by gastric gavage, dissolved or suspended in a 10 percent aqueous solution of acacia gum, contained in a volume of 1 ml. per 100 g. body weight, followed immediately by tap water to a total of 5 ml. per rat.

The controls were given only 10 percent acacia gum solution and water.

As phlogistic agent, a 1 percent carrageenin suspension in sterile physiological sodium chloride solution was used, injecting 0.05 ml. of it under the plantar aponeurosis of the hind right paw, 1 hour after the oral treatment. Immediately thereafter the volume of the injected paw was measured by means of a plathysmograph and the measure repeated 3 hours later.

The increase in foot volume represents the degree of the developed edema.

By comparing the edema of the treated animals with that of the controls, it is possible to evaluate the effectiveness of the tested drugs. The following table 1 reports the results obtained with some compounds of the invention, expressed as percent decrease of the edema in the treated animals with respect to the controls. The toxicities are also given for a better evaluation of the safety of the compounds.

TABLE 1

| Compound of example | $LD_{50}$ mg/kg i.p., in mice | Dose mg/kg os, in rats | Carrageenin edema Decrease % |
|---|---|---|---|
| 3 | 1000 | 200 | − 44.0 |
|   |      | 100 | − 41.6 |
| 5 | 500  | 100 | − 51.3 |
|   |      | 50  | − 37.5 |

The following non limitative examples illustrate the invention.

EXAMPLE 1

Preparation of ethyl fluoro(p-methoxyphenyl)-acetate.

1. According to method A.

To a solution of 1.3 g. (4.5 mmole) of diethyl fluoro(p-methoxyphenyl)-malonate, in 100 ml. of absolute ethanol, 8.5 ml. of a 3 percent ethanolic solution of potassium hydroxide are added during 6 hours at room temperature. At the end of the reaction, 1 liter of diethyl ether is added and the mixture is allowed to stand overnight. A precipitate consisting of the monopotassium salt of the monoethyl fluoro(p-methoxyphenyl)-malonate is formed. After filtering, the solution is concentrated to dryness. The residue is distilled and the fraction boiling at 100°–105°C/0.2 mm. is collected.

2. According to method B.

An amount of 340 ml. of amberlite IR 120 (H), previously washed with absolute ethanol, is transferred into a water-jacketed glass tube, 60 cm. long and of 3 cm. inside diameter, and hot absolute ethanol is added, until the top of the column is covered by the liquid. While water at 60°C is circulated into the jacket, a hot solution containing 10 g. of monopotassium salt of the monoethyl fluoro(p-methoxyphenyl)-malonate dissolved in 1.4 liters of absolute ethanol, is slowly poured onto the top of the column, collecting at the same time the eluate. When all the solution has been added, the column is washed with hot ethanol, and the eluate concentrated in vacuo at a temperature not exceeding 50°C. The residue is taken up with diethyl ether and quickly washed with a 10 percent aqueous solution of sodium bicarbonate. The organic phase is dried over sodium sulphate and the solvent removed with the aid of vacuum in an evaporator. The residue is distilled at 100°–105°C/0.2 mm., avoiding overheating. A colorless oil is obtained, consisting of ethyl fluoro(p-methoxyphenyl)-acetate. Yield 77,8 percent; $n_D^{20°} = 1,5133$.
Analysis Calcd. for $C_{11}H_{13}FO_3$ C, 62,25; H, 6,17; F, 8,95
Found C, 62,17; H, 6,30; F, 8,76

3. According to method C.

To a solution of 11.65 g. (55 mmole) of ethyl-p-methoxymandelate in 150 ml. of anhydrous methylene chloride, 20.8 g. (0.11 mole) of 2-chloro-1,1,2-trifluoro-triethylamine are added. The solution is allowed to stand overnight at 5°C, then for 5 more hours at room temperature. It is then washed with a saturated sodium carbonate solution, and successively with water, dried over anhydrous sodium sulphate and concentrated. A residue is obtained which is distilled in vacuo, collecting the fraction boiling at 100°–106 °C/0.2 mm. An amount of 8.6 g. of ethyl fluoro(p-methoxyphenyl)-acetate is obtained. Yield 73.8 percent.
Analysis Calcd. for $C_{11}H_{13}FO_3$ C, 62,25; H, 6,17; F, 8,95
Found C, 61,59 H, 5,80; F, 8,61

EXAMPLE 2

Preparation of ethyl p-ethoxyphenyl (fluoro)-acetate
2. According to method A.

To a solution of 4.3 g. (14 mmole) of diethyl p-ethoxyphenyl (fluoro)-malonate in 30 ml. of absolute ethanol 28ml. of a 3 percent ethanolic solution of potassium hydroxide (14 mmole) are added during 7 hours at room temperature. Then, 3 liters of diethy ether are added and the mixture is allowed to stand overnight. A precipitate of monopotassium salt of the monoethyl p-ethoxyphenyl (fluoro)-malonate is formed and filtered off. The solution is concentrated to dryness in vacuo. The residue is distilled, collecting the fraction boiling at 100°–105°C/0.2 mm.
2) According to method B.

A solution of 10 g. (32 mole) of the monopotassium salt of the monoethyl p-ethoxyphenyl (fluoro)-malonate in 500 ml. of hot absolute ethanol, is chromatographed under the same conditions and using the same apparatus described in example 1. The eluate is concentrated in vacuo at a temperature not exceeding 40°C. The residue is taken up with diethyl ether, washed with a 10 percent solution of sodium bicarbonate and dried over sodium sulphate. The solvent is evaporated and the residue is distilled in vacuo, collecting the fraction boiling at 105°–107°C/0.2 mm. A colorless oil is obtained consisting of ethyl p-ethoxyphenyl (fluoro)-acetate. Yield 87 percent; $n_D^{20°} = 1,5095$.
Analysis Calcd. for $C_{12}H_{15}FO_3$ C, 63,69; H, 6,68; F, 8,39
Found C, 63,59; H, 6,88; F, 8,31

EXAMPLE 3

Preparation of ethyl fluoro (p-isobutylphenyl)-acetate
According to method A.

In a solution of 19.5 g. (60 mmole) of diethyl fluoro(p-isobutylphenyl)-malonate, in 125 ml. of absolute ethanol, 112 ml. (60 mmole) of a 3 percent ethanolic solution of potassium hydroxide are added drop by drop at room temperature during 7 hours. A volume of 1.5 liters of diethyl ether is added and the mixture is allowed to stand overnight. After filtering the precipitated salts the solution is concentrated in vacuo at a temperature not exceeding 40°C. The residue is distilled in vacuo and the fraction boiling at 93°–101°C/0.2 mm. is collected. An oil is obtained, consisting of ethyl fluoro(p-isobutylphenyl)-acetate. Yield 74 percent; $n_D^{20°} = 1,4958$.
Analysis Calcd. for $C_{14}H_{19}FO_2$ C, 70,56; H, 8,03; F 7,97
Found C, 70,40; H, 8,20; F, 7,85

EXAMPLE 4

Preparation of ethyl fluoro(1-naphthyl)-acetate
1. According to method A.

To a solution of 4.3 g. (14 mmole) of diethyl fluoro(1-naphthyl)-malonate in 130 ml. of absolute ethanol 26.5 ml. of a 3 percent ethanolic solution of potassium hydroxide are added at room temperature during 7 hours. A volume of 3 l. of diethyl ether is added and the mixture is allowed to stand overnight. The precipitated salts are filtered off, then the filtrate is concentrated to dryness in vacuo at a temperature not exceeding 40°C. An oily residue is obtained.
2. According to method B.

It is prepared working under the same conditions described in example 1. A quantity of 12.7 f. (40 mmole) of the monopotassium salt of the monoethyl fluoro(1-napthyl)-malonate, dissolved at 40°C in 1.1 liters of absolute ethanol, are passed through a column of 340 ml. of amberlite IR 120 (H). The eluate is concentrated and the residue taken up with diethyl ether. The ether solution is washed with a 10 percent solution of sodium bicarbonate, dried over sodium sulphate and concentrated. The residue is distilled in vacuo, collecting the fraction boiling at 120°–125°C/0.2 mm. An oil is obtained consisting of ethyl fluoro(1-naphthyl)-acetate. Yield 84 percent; $n_D^{20°} = 1,5803$.
Analysis Calcd. for $C_{14}H_{13}FO_2$ C, 72,39; H, 5,64; F, 8,18
Found C, 72,25; H, 5,87 F, 8,18

EXAMPLE 5

Preparation of ethyl 2-dibenzofuranyl(fluoro)-acetate.
According to method A.

To a solution of 9.15 g. (26,5 mole) of diethyl 2-dibenzofuranyl (fluoro)-malonate, in 250 ml. of absolute ethanol, 48.5 ml. of a 3 percent potassium hydroxide solution in ethanol are added during 7 hours. A volume of 3 liters of diethyl ether is added and the mixture is allowed to stand overnight. The precipitated salts are filtered off and the solution is concentrated in vacuo at a temperature not exceeding 40°C. The residue is crystallized from petroleum ether. This is diethyl 2-dibenzofuranyl(fluoro)-acetate. Yield 71 percent; m.p. 76°–77°C.

Analysis

Calcd. for C₁₆H₁₃FO₃ C, 70,57; H, 4,61; F, 6,97
Found C, 70,34; H, 500; F, 6,7

We claim:

1. A compound possessing antiinflammatory activity and of the formula

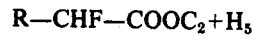

wherein R is (p-isobutylphenyl).

2. A compound possessing antiinflammatory activity and of the formula

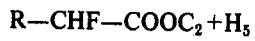

wherein R is (p-methoxyphenyl).

* * * * *

UNITED STATES PATENT OFFICE
CERTIFICATE OF CORRECTION

Patent No. 3,699,151  Dated October 17, 1972

Inventor(s) Bruno Cavalleri, Elvio Bellasio, Emilio Testa, Giulio Maffii.

It is certified that error appears in the above-identified patent and that said Letters Patent are hereby corrected as shown below:

In Claims 1 and 2 the formula should read:

$$R-CHF-COOC_2H_5$$

Signed and sealed this 18th day of December 1973.

(SEAL)
Attest:

EDWARD M. FLETCHER, JR.  RENE D. TEGTMEYER
Attesting Officer  Acting Commissioner of Patents